(12) United States Patent
Feau

(10) Patent No.: US 8,996,438 B2
(45) Date of Patent: Mar. 31, 2015

(54) SYSTEM FOR SELECTING AN ITEM OF DATA REPRESENTING A PARAMETER OF THE AIR, ENGINE CONTROL SYSTEM, AIRCRAFT COMPRISING SUCH SYSTEMS AND ASSOCIATED METHOD

(75) Inventor: Julien Feau, Toulouse (FR)

(73) Assignee: Airbus Operations S.A.S., Toulouse (FR)

(*) Notice: Subject to any disclaimer, the term of this patent is extended or adjusted under 35 U.S.C. 154(b) by 542 days.

(21) Appl. No.: 13/146,166

(22) PCT Filed: Jan. 21, 2010

(86) PCT No.: PCT/FR2010/000055
§ 371 (c)(1),
(2), (4) Date: Jul. 25, 2011

(87) PCT Pub. No.: WO2010/086525
PCT Pub. Date: Aug. 5, 2010

(65) Prior Publication Data
US 2011/0282822 A1 Nov. 17, 2011

(30) Foreign Application Priority Data
Jan. 28, 2009 (FR) .................................... 09 50533

(51) Int. Cl.
*G01P 13/02* (2006.01)
*G06N 5/04* (2006.01)

(52) U.S. Cl.
CPC ............... *G01P 13/025* (2013.01); *G06N 5/04* (2013.01)
USPC ...................................................... 706/47

(58) Field of Classification Search
CPC ......... G06N 5/04; B64C 13/10; G01P 13/025
See application file for complete search history.

(56) References Cited

U.S. PATENT DOCUMENTS

| 5,001,638 A | 3/1991 | Zimmerman et al. |
| 5,639,964 A * | 6/1997 | Djorup ....................... 73/170.12 |
| 2005/0174073 A1 | 8/2005 | Garnaud et al. |
| 2007/0239326 A1* | 10/2007 | Johnson et al. ................... 701/9 |

(Continued)

FOREIGN PATENT DOCUMENTS

| EP | 0 393 730 | 10/1990 |
| FR | 2 850 356 | 7/2004 |
| FR | 2 916 290 | 11/2008 |

OTHER PUBLICATIONS

Bai et al, Wireless Sensor Network for Aircraft Health Monitoring, 2004.*
Latif-Shabgahi et al, A Taxonomy for Software Voting Algorithms Used in Safety-Critical Systems, 2004.*
Calia, A. et al., "Air Data Failure Management in a Full-Authority Fly-By-Wire Control System", International Conference on Control Applications, 2006 IEEE, pp. 3277-3281, XP-031011672, (Oct. 1, 2006).
International Search Report Issued Apr. 6, 2010 in PCT/FR10/000055 filed Jan. 21, 2010.

* cited by examiner

*Primary Examiner* — Alan Chen
*Assistant Examiner* — Mikayla Chubb
(74) *Attorney, Agent, or Firm* — Oblon, McClelland, Maier & Neustadt, L.L.P.

(57) ABSTRACT

A system and method for selecting a datum representative of an air parameter, including a plurality of sources each capable of delivering a datum representative of a measured value of the parameter. The system includes: a mechanism for determining, for at least some sources, a number of other sources from the plurality of sources in agreement with a source in question; and a mechanism for selecting the datum selected from the data delivered by the sources for which the determined agreement number is the maximum. An engine control system, or an aircraft can include such a system or implement such a method.

14 Claims, 4 Drawing Sheets

(56) References Cited

U.S. PATENT DOCUMENTS

2008/0288130 A1 11/2008 Feau
2010/0100260 A1* 4/2010 McIntyre et al. ................ 701/6
2011/0282560 A1 11/2011 Feau

OTHER PUBLICATIONS

SYSTEM FOR SELECTING AN ITEM OF DATA REPRESENTING A PARAMETER OF THE AIR, ENGINE CONTROL SYSTEM, AIRCRAFT COMPRISING SUCH SYSTEMS AND ASSOCIATED METHOD

The invention relates to a system for selecting a datum representative of an air parameter, an engine control system, an aircraft comprising such systems and an associated method.

It is known to take into account the data originating from a plurality of redundant sources for measuring an air parameter (such as, for example, the total pressure, the static pressure or the temperature) and to select from among these data the one that finally will be used, for example in a computer for controlling an engine (in this case generally for the purpose of determining parameters such as standard altitude, the Mach number and the difference between the actual temperature and the standard temperature).

Systems performing these operations are described, for example, in the patent applications FR 2 850 356 and FR 2 916 290.

In these systems, the robustness of the selection logic is improved by virtue of the considerable number of comparisons among sources. Moreover, in order to abide by the constraint of insulation of the engines even though these systems always provided for selection of the datum to be used in the engine control computers, the end result was a relatively complex design involving either the exchange of precision information items (each relating to a datum originating from a source of the fuselage), or the exchange of comparison results.

This complexity is found again in the selection logics used, based on diagrams listing the different types of situations conceivable as a result of the two-by-two comparison of the different sources.

This invention is intended to propose a simpler selection logic, while making it possible to maintain a good robustness and to be able to abide by the constraint of insulation of the engines.

For this purpose in particular, the invention proposes a system for selecting a datum representative of an air parameter, comprising a plurality of sources which are each capable of delivering a datum representative of a measured value of the parameter, characterized by means for determining, for certain sources at least, the number of other sources of the plurality in agreement with the concerned source and means for choosing the selected datum from among the data delivered by the sources for which the determined agreement number is maximum.

The selection logic defined in this way makes it possible, in particularly simple manner, to choose the source to be used from among those delivering the most reliable data.

In practice, another source is, for example, in agreement with the concerned source if the absolute value of the difference between the datum delivered by the concerned source and the datum delivered by the other source is less than a predetermined threshold.

In the present context, it may be provided for the means for choosing the selected datum to be capable of being inactive when the said means for determining identify four sources in agreement by pairs, the sources of one pair not being in agreement with the sources of the other pair. In this case, it is in fact impossible to make a decision between the two pairs of sources in agreement.

The said certain sources are associated, for example, with a fuselage of the aircraft so as to be able, most of the time, to select the same source for the different engines (which is not possible with the sources of the engines because of the constraint of insulation of the engines).

It may be provided, for example, for the sources of the plurality (in practice made up of at least three sources) to be located at a fuselage of the aircraft, which makes it possible to avoid placing sources at the engines.

As a variant, at least one of the sources of the plurality may be located at an engine of the aircraft. This source thus may be used in the event of a problem during selection of the datum.

The invention also proposes a system for controlling an aircraft engine, characterized in that it comprises a system for selecting a datum as indicated above and means for determining an instruction for controlling the engine according to the selected datum.

The invention also provides for an aircraft comprising one of the systems considered above.

The invention thus proposes a method for selecting a datum representative of an air parameter from among a plurality of data each representative of a measured value of the parameter and delivered by a respective plurality of sources, characterized by the following steps:

determining, for certain sources at least, the number of other sources of the plurality in agreement with the concerned source;

choosing the selected datum from among the data delivered by the sources for which the determined agreement number is maximum.

It further may be provided for the choosing step not to be implemented when the determining step identifies four sources in agreement by pairs, the sources of one pair not being in agreement with the sources of the other pair.

Other characteristics and advantages of the invention will become more apparent on reading of the description that follows, presented with reference to the attached drawings in which:

FIG. 1 shows the main components of a system for processing air data in an aircraft. Such a system allows in particular the selection of a datum representative of an air parameter from among a plurality of data originating from redundant sources with a view to using the selected datum, for example in the context of control of an engine.

Figure 1:
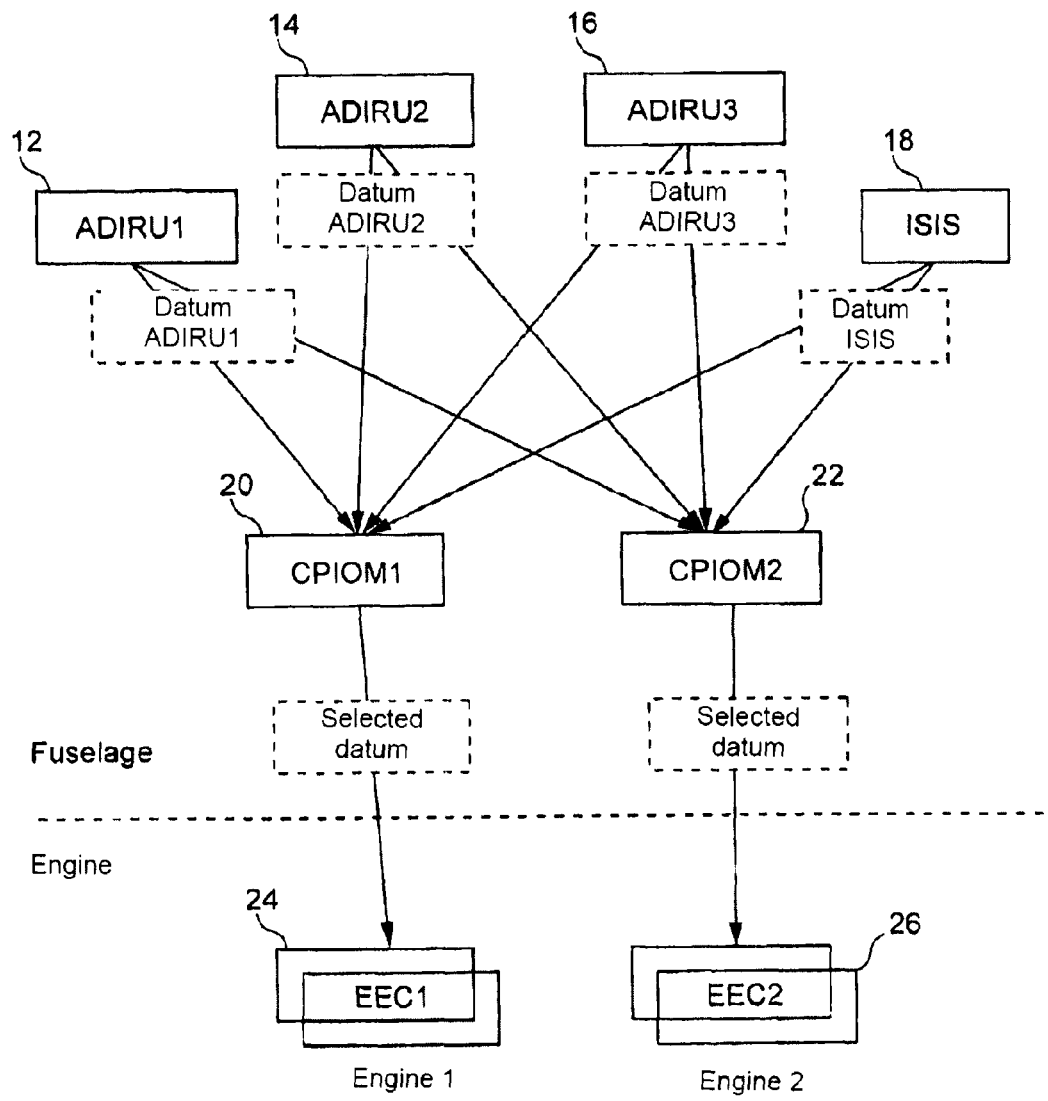
FIG. 1 shows a system for processing air data according to a first exemplary implementation of the invention.

This system comprises first of all a plurality of computers located at the fuselage of the aircraft:

three computers 12, 14, 16 associated with sources located on the fuselage, generally designated as ADIRU (for "Air Data and Inertial Reference Unit");

a computer 18 of ISIS (for "Integrated Standby Instrument System") type, which processes a standby source of air data;

generic computers 20, 22, for example of the CPIOM (for "Core Processing Input/Output Module") type, which here allow in particular the selection of a datum from among those received from the aforementioned computers as described in detail in the following.

Considered here as fuselage of the aircraft are all the parts of the aircraft with the exception of the engine or engines, whether it concerns engines borne by the wings or an engine located at the tail of the aircraft.

Because of their respective function in the context of this description, there shall be designated as "selection computers" 20, 22 the computers of CPIOM type and as "measurement computers" 12, 14, 16, 18 the computers of ADIRU and ISIS type, for that matter without its precluding these computers from being able to perform other functions in practice.

Each of the measurement computers ADIRU1, 12, ADIRU2 14, ADIRU3 16 and ISIS 18 determines a datum representative of the concerned air parameter (for example the total pressure) according to a measurement made by a sensor associated with the computer and located at the fuselage of the aircraft.

In this way these different measurement computers form redundant and independent sources of data representative of the concerned parameter.

Each selection computer 20, 22 receives different data transmitted independently by each measurement computer 12, 14, 16, 18 and undertakes selection of a datum from among same according to the logic explained in detail below.

The selected datum then is transmitted to a control computer 24, 26 associated with an engine and located there.

In the example shown on FIG. 1, selection computer CPIOM1 20 is associated with control computer EEC1 24, while selection computer CPIOM2 22 is associated (that is to say transmits the selected datum to) control computer EEC2 26.

It is seen that the data exchanges indicated above (both between the measurement computers and the concerned selection computer and between the selection computer and the engine control computer) are implemented by virtue of the data exchange bus usually connecting the computers with each other in an aircraft.

The logic for implementing the selection carried out in each selection computer of CPIOM type 20, 22 now is described with reference to FIG. 2.

Figure 2:
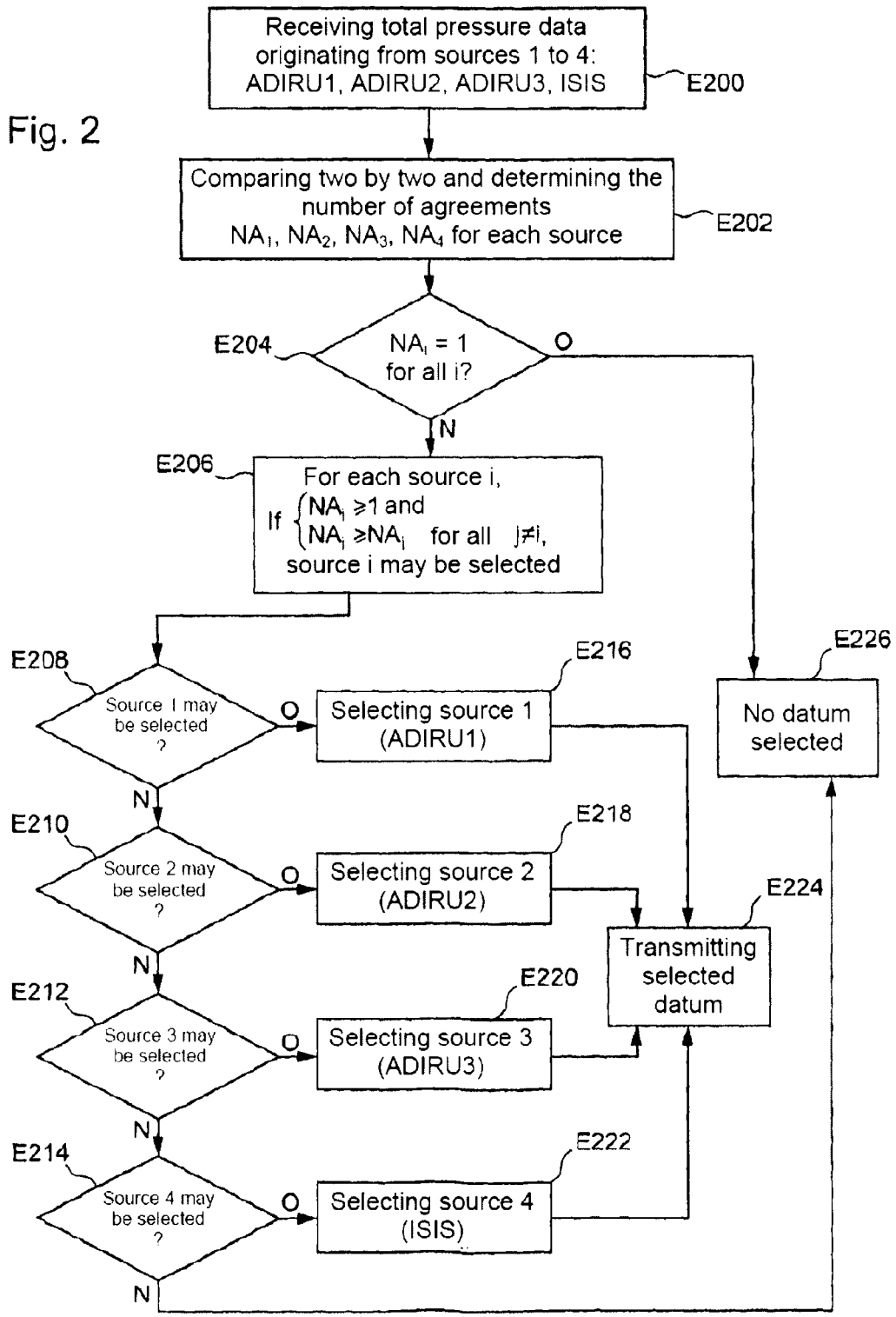
FIG. 2 shows the logic for selecting the data in the system of FIG. 1.

FIG. 2 thus shows the main steps of the functioning of a selection computer 20, 22 with regard to processing and selection from among data representative of the total pressure. Processing of other parameters concerned (for example static pressure and temperature) may be carried out according to an identical logic.

The processing method begins at step E200 with the reception of data representative of the total pressure coming from measurement computers 12, 14, 16, 18 each associated with a source: ADIRU1, ADIRU2, ADIRU3, ISIS, designated respectively as sources 1 to 4 below.

The selection computer concerned then performs at step E202 the two-by-two comparison of the data received and in this way is able to determine, for each source i, the number of other sources in agreement $NA_i$, two sources being in agreement if their data are valid and differ by a value less than (in absolute value) a threshold, for example of 38 mb for the total pressure.

It then is verified at step E204 that the case is not such that all the numbers of agreements $NA_i$ are equal to 1 (which occurs when the sources are in agreement by pairs but in disagreement from one pair to the other).

If all the numbers of agreements $NA_i$ are equal to one, it is considered that a value cannot be selected satisfactorily (since nothing makes it possible to favor one pair in relation to the other) and one goes on to step E226 which corresponds to an absence of possible selection (described farther on).

If there is at least one source i for which the number of agreements $NA_i$ is other than 1 (negative response to step E204), step E206 is undertaken, during which each source is successively taken into consideration: if the number of agreements $NA_i$ for the source considered is on the one hand greater than or equal to 1 and on the other hand greater than or equal to the numbers of agreements $NA_j$ of all the other sources, it is considered that source i may be selected.

That amounts to saying that all the sources that reach a non-zero and maximum number of agreements among the four sources may be selected.

When this processing is performed, one goes on to step E208 at which it is determined whether source 1 (corresponding to computer 12 ADIRU1) may be selected, in which case source 1 is selected (step E216).

If not at step E208, it is determined at step E210 whether source 2 may be selected, in which case source 2 (associated with computer 14 ADIRU2) is selected at step 218).

If the response is negative at step E210, it is determined at step E212 whether source 3 may be selected, in which case source 3 (corresponding to computer 16 ADIRU3) is selected at step E220.

If source 3 may not be selected at step E212, it is determined at step E214 whether source 4 (corresponding to measurement computer 18 ISIS) may be selected, in which case the datum originating from this computer 18 (source 4) is selected at step E222.

Irrespective of the datum selected (steps E216 to E222), this selected datum then is transmitted to control computer 24, 26 associated with the concerned selection computer 20, 22.

By using this solution for the different air parameters, each control computer 24, 26 thus may determine the control information items intended for the engine (in particular the information item on control of engine thrust) by means of parameters (such as the standard altitude, the Mach number and the difference between the actual temperature and the standard temperature) each obtained in a respective function table according to data representative of the air parameters (static pressure, total pressure and temperature) determined as indicated above.

On the other hand, if even source 4 may not be selected (in which case none of the sources is selected, which occurs when no agreement among sources has been detected), one goes on to step E226 relating to the absence of selection.

The processing performed at step E226 in the absence of data selection may consist, for example, in bringing back the last datum selected for a given period (for example 5 seconds), then transmitting a signal of invalidity of the datum once this period has elapsed (in which case control computer 24, 26 will receive this information item on invalidity of the datum and will go over to a default operating mode, that is to say without knowledge of the value of the parameter).

It is understood that the selection logic which has just been described makes it possible to select the datum originating from one of the sources which are in agreement with the greatest number of other sources, the choice among the different sources having reached this maximum number of agreements being set by convention, that is to say in a predetermined manner, so that selection computers 20, 22 in this case choose the same datum, which allows a symmetrical functioning of the engines whose control computers receive this datum.

Figure 3:
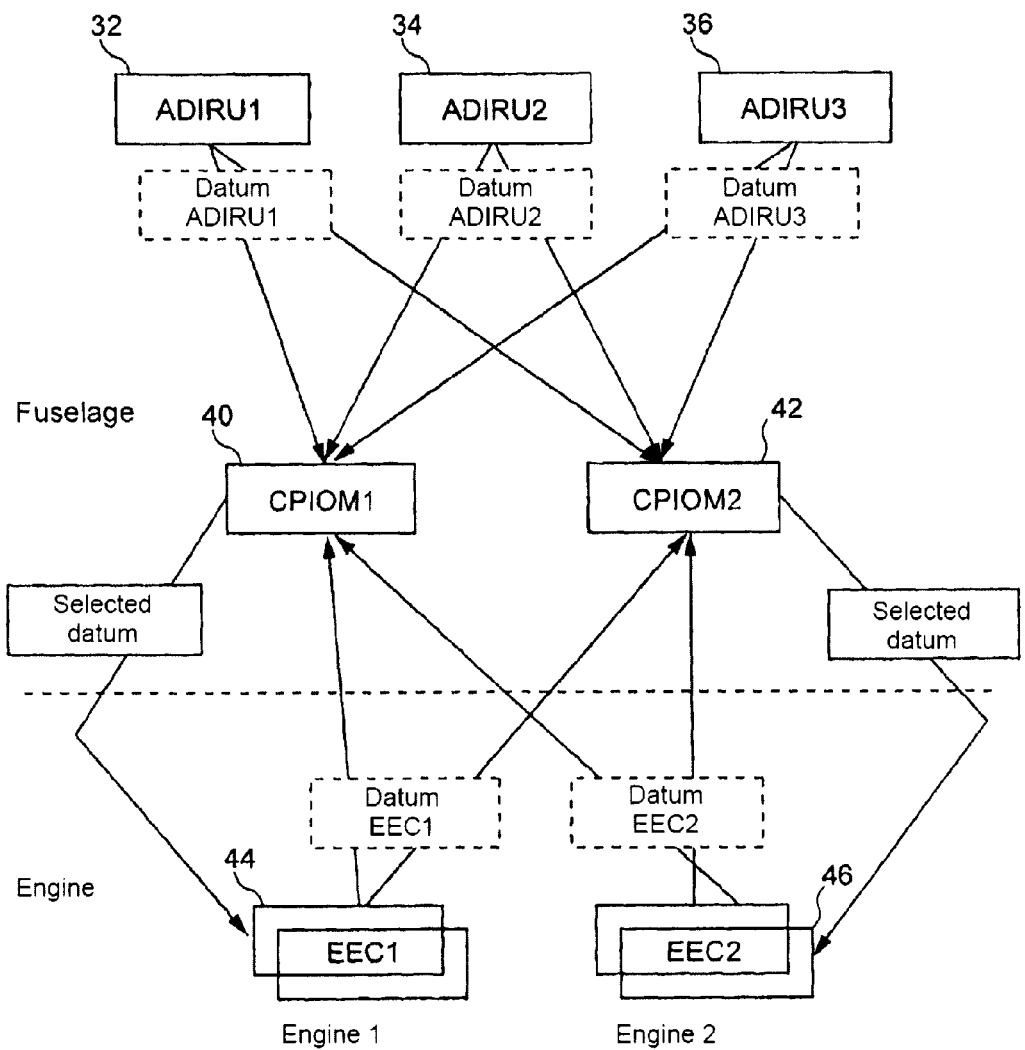
FIG. 3 shows a system for processing air data according to a second exemplary implementation of the invention.

FIG. 3 shows the main components of a processing system for data representative of the air parameters according to a second embodiment.

In this second embodiment, three measurement computers ADIRU1, ADIRU2, ADIRU3 (respectively referenced subsequently as 32, 34, 36) each determine the data representative of a value of each of the measured parameters (static pressure, total pressure, temperature) on the basis of measurements performed by sensors associated with the fuselage of the aircraft.

In this way, the three measurement computers 32, 34, 36 constitute redundant and independent sources of air data.

In this embodiment, engine control computers 44, 46, each associated with a separate engine of the aircraft, also each deliver data representative of the air parameters determined by means of sensors associated with (that is to say here located on the) concerned engine.

The system shown on FIG. 3 further comprises two selection computers 40, 42, here located at the fuselage of the aircraft, and which each receive data representative of each air parameter from the five sources mentioned above, namely the three measurement computers 32, 34, 36 and the two control computers 44, 46.

The data are, for example, exchanged among the computers by means of an avionic bus with which the aircraft is equipped.

It is further recalled that the terminology "measurement computer," "selection computer," for the concerned computers relate to the function implemented in the context of this description, nonetheless without precluding these computers from being able to implement other functions in the aircraft.

Each selection computer 40, 42 selects (for each parameter) one of the five data received from the different computers on the basis of the selection logic described below and transmits (always for each parameter) the selected datum to control computer 44, 46 associated with the concerned selection computer 40, 42 (selection computer CPIOM1 40 being associated with control computer EEC1 44 and selection computer CPIOM2 42 being associated with control computer EEC2 46).

Each control computer 44, 46 thus receives for each parameter a selected datum representative of the value of this parameter and in this way is able to determine, with the aid of function tables for example, other parameters used for determining the control information items intended for the engine such as, for example, the standard altitude, the Mach number and the difference between the actual temperature and the standard temperature.

Figure 4:
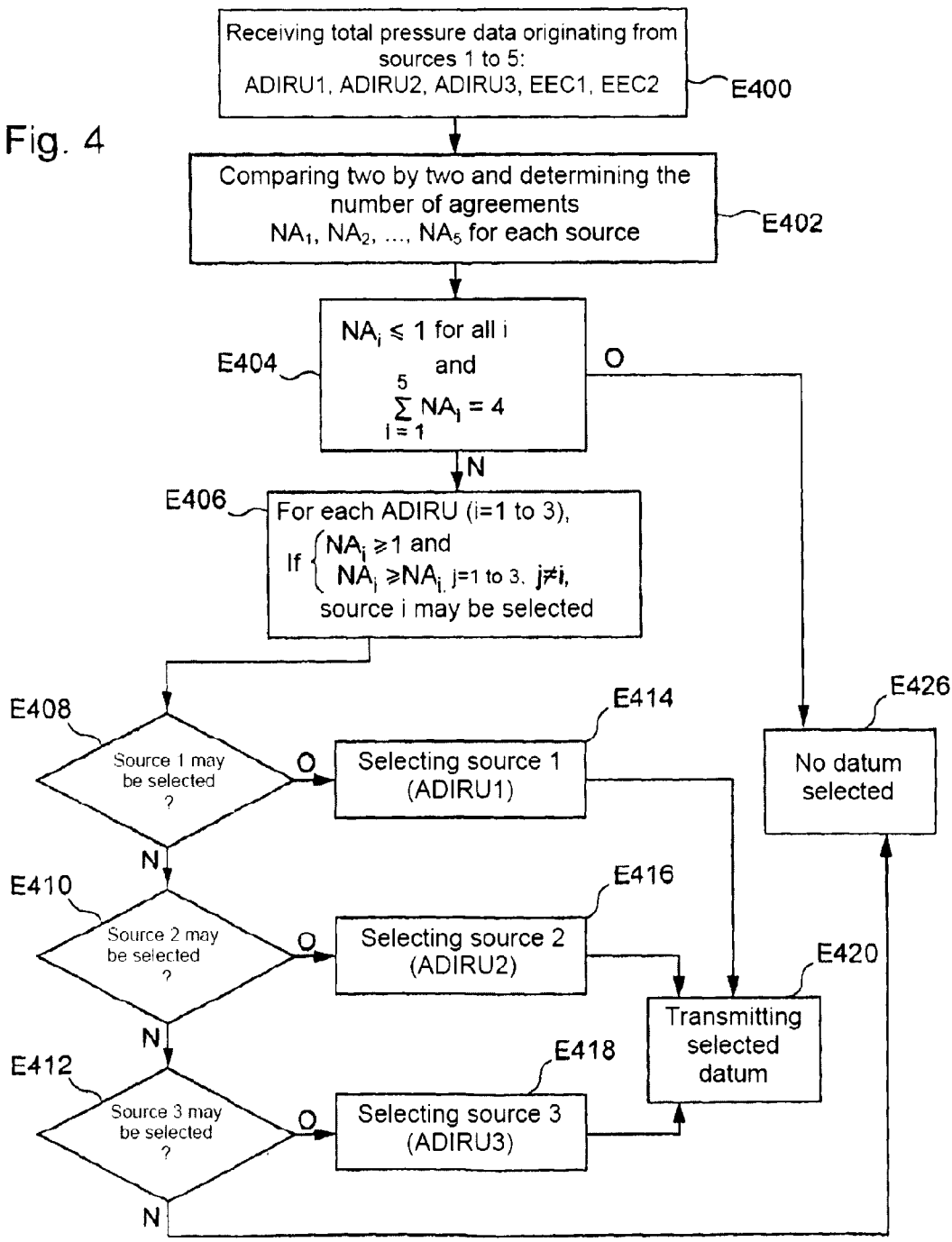
FIG. 4 shows logic for selecting data in the system of FIG. 3.

FIG. 4 shows the main steps for implementation of selection of a datum representative of an air parameter (here the temperature) such as performed in each of the two selection computers 40, 42.

As already indicated, the concerned selection computer 40, 42 receives data representative of the measured temperature values transmitted by each of the five independent sources (ADIRU1, ADIRU2, ADIRU3, EEC1, EEC2, respectively designated below as sources 1 to 5) at step E400.

At step E402, selection computer 40, 42 then undertakes two-by-two comparison of the received data and in this way determines for each source i the number $NA_i$ of other sources in agreement with the source i concerned (the values of the $NA_i$s therefore varying between 0 and 4). For example, it is considered that two temperature data are in agreement when they are valid and when the absolute value of their difference is less than 5° C.

At step E404 it then is determined whether all the values $NA_i$ are equal either to 0, or to 1 and whether the sum of all the values $NA_i$ amounts to 4 (which would mean that two pairs of sources are in agreement only in each pair and that therefore no decision can be made as to a datum correctly assessing the value of the parameter).

In the case of a positive determination at step E404, one goes on to step E422 for processing cases of impossibility of selection of a source (explained in detail farther on).

In the case of a negative determination at step E404, one goes on to step E406 during which it is verified for each source corresponding to a measurement computer located at the fuselage (that is to say for each ADIRU, or for each source i with i ranging between 1 and 3) on the one hand whether the associated number of agreements $NA_i$ is greater than or equal to 1 and, on the other hand, whether this number of agreements is greater than or equal to the numbers of agreements $NA_j$ obtained by the other ADIRUs (that is to say when j takes on values other than i ranging between 1 and 3).

If the aforementioned condition is verified (that is to say when the number of agreements $NA_i$ of source i considered is the greatest number of non-zero agreements found among the ADIRUs), it is considered that source i may be selected.

When the determination which has just been explained is made for all the sources associated with the fuselage (ADIRU), one proceeds to step E408 at which it is verified whether it has been determined previously that source 1 (datum originating from measurement computer 32 ADIRU1) may be selected, in which case selection of source 1 (that is to say of the datum originating from measurement computer 32) is undertaken at step E414.

If source 1 may not be selected, one proceeds to step E410 at which it is verified whether source 2 may be selected: if so, source 2 (that is to say the datum transmitted by measurement computer 34, also called ADIRU2) is selected at step E416.

If it is determined at step E410 that source 2 may not be selected, it is verified at step E412 whether source 3 may be selected; if so, the datum corresponding to source 3 (that is to say the datum transmitted by measurement computer 36, also called ADIRU3) is selected at step E418.

If a datum has been selected (steps E414, E416 or E418), transmission of this selected datum to control computer 44, 46 associated with concerned selection computers 40, 42 is undertaken at step E420.

If on the other hand it has been determined at step E412 that even source 3 may not be selected, step E422 already mentioned is undertaken for processing of the case where it is impossible to select a datum.

It may be provided, for example, for the implementation of step E422 for the last temperature value to be brought back for a predetermined period (for example 5 seconds), at the end of which period selection computer 40, 42 will transmit to associated control computer 44, 46 an information item on invalidity of the selected datum previously transmitted.

The concerned control computer 44, 46 then will be able, for example, either to select the datum generated by its own source, or change over to default operating mode if its own source is unavailable.

The preceding embodiments are only possible examples of implementation of the invention.

The invention claimed is:

1. A system for selecting a datum representative of an air parameter, comprising:
   a plurality of redundant and independent sources that are each configured to deliver a datum representative of a measured value of the parameter;
   means for determining, for at least a concerned source, a number of other sources of the plurality of redundant and independent sources in agreement with the concerned source; and
   means for choosing the selected datum to be used in a control computer from among data delivered by the plurality of redundant and independent sources for which the determined agreement number is maximum,
   wherein the means for choosing the selected datum is configured to be inactive when:

the means for determining identifies at least four sources of the plurality of redundant and independent sources in agreement by pairs, and sources of one pair of the plurality of redundant and independent sources are not in agreement with sources of another pair of the plurality of redundant and independent sources.

2. The system for selecting according to claim 1, wherein another source is in agreement with the concerned source if an absolute value of a difference between the datum delivered by the concerned source and the datum delivered by the another source is less than a predetermined threshold.

3. The system for selecting according to claim 1, wherein the means for choosing the selected datum is configured to be inactive when:

the means for determining identifies four sources of the plurality of redundant and independent sources in agreement by pairs, and sources of one pair of the plurality of redundant and independent sources are not in agreement with sources of another pair of the plurality of redundant and independent sources.

4. The system for selecting according to claim 1, wherein the concerned source is associated with a fuselage of an aircraft.

5. The system for selecting according to claim 1, wherein the sources of the plurality are located at a fuselage of an aircraft.

6. The system for selecting according to claim 1, wherein at least one of the sources of the plurality of sources is located at an engine of an aircraft.

7. A system for controlling an aircraft engine, comprising: the system for selecting a datum according to claim 1; and means for determining an instruction for controlling the engine according to the selected datum.

8. An aircraft comprising the system according to claim 1.

9. The system for selecting according to claim 1, wherein the means for determining includes means for determining, for each of a first number of the plurality of redundant and independent sources as the concerned source, the number of other sources of the plurality of redundant and independent sources in agreement with the concerned source, the means for choosing includes means for choosing, from a second number of the plurality of redundant and independent sources, the selected datum to be used in the control computer from among data delivered by the plurality of redundant and independent sources for which the determined agreement number is the maximum, and the second number is less than the first number.

10. The system for selecting according to claim 9, wherein the first number of the plurality of redundant and independent sources includes at least one source located at a fuselage of an aircraft and at least one source located at an engine of the aircraft, and the second number of the plurality of redundant and independent sources excludes the at least one source located at the engine.

11. A method for selecting a datum representative of an air parameter from among a plurality of data each representative of a measure value of the parameter and delivered by a respective plurality of redundant and independent sources, the method comprising:

determining, for at least a concerned source, a number of other sources of the plurality of redundant and independent sources in agreement with the concerned source; and choosing the selected datum to be used in a control computer from among the data delivered by the plurality of redundant and independent sources for which the determined agreement number is maximum, wherein the choosing is not implemented when:

the determining identifies at least four sources of the plurality of redundant and independent sources in agreement by pairs, and sources of one pair of the plurality of redundant and independent sources are not in agreement with sources of another pair of the plurality of redundant and independent sources.

12. The method according to claim 11, wherein the choosing is not implemented when:

the determining identifies four sources of the plurality of redundant and independent sources in agreement by pairs, and sources of one pair of the plurality of redundant and independent sources are not in agreement with sources of another pair of the plurality of redundant and independent sources.

13. The method according to claim 11, wherein the determining includes determining, for each of a first number of the plurality of redundant and independent sources as the concerned source, the number of other sources of the plurality of redundant and independent sources in agreement with the concerned source, the choosing includes choosing, from a second number of the plurality of redundant and independent sources, the selected datum to be used in the control computer from among the data delivered by the plurality of redundant and independent sources for which the determined agreement number is the maximum, and the second number is less than the first number.

14. The method according to claim 13, wherein the first number of the plurality of redundant and independent sources includes at least one source located at a fuselage of an aircraft and at least one source located at an engine of the aircraft, and the second number of the plurality of redundant and independent sources excludes the at least one source located at the engine.

* * * * *